United States Patent [19]

Fitzgerald, Jr.

[11] 4,396,988

[45] Aug. 2, 1983

[54] METHOD AND APPARATUS FOR AUTOMATICALLY DETERMINING THE X-Y INTERSECTION OF TWO CURVES IN A RASTER TYPE DISPLAY SYSTEM INCLUDING A BUFFER REFRESH MEMORY

[75] Inventor: William J. Fitzgerald, Jr., Ridgefield, Conn.

[73] Assignee: International Business Machines Corporation, Armonk, N.Y.

[21] Appl. No.: 221,869

[22] Filed: Dec. 31, 1980

[51] Int. Cl.³ .............................................. G06F 3/153
[52] U.S. Cl. .................................. 364/521; 340/720; 364/715; 364/718
[58] Field of Search ............... 364/515, 521, 715, 718, 364/735; 340/720, 747, 797, 805; 178/18

[56] References Cited

U.S. PATENT DOCUMENTS

| | | | |
|---|---|---|---|
| 3,987,284 | 10/1976 | Hogan et al. | 364/521 |
| 4,020,281 | 4/1977 | Davis, Jr. | 178/18 |
| 4,023,025 | 5/1977 | Rowe et al. | 364/715 |
| 4,334,274 | 6/1982 | Agui et al. | 364/515 |

*Primary Examiner*—Jerry Smith
*Attorney, Agent, or Firm*—Roy R. Schlemmer

[57] ABSTRACT

A method and apparatus for determining the X—Y coordinates on the raster of the intersection of two curves one of which is stored in the display system raster refresh buffer. The second curve is generated by a curve generator or some other source of sequential X—Y coordinate data defining the X—Y coordinates on the raster where the second curve would lie. As each X—Y coordinate is generated by curve generator it is translated into a buffer address and the contents of that address in the buffer memory are accessed and a determination is made to see if said first curve exists at that address. If an element of the first curve is found to exist in the buffer store at the generated address location, it is known an intersection point has been found and the appropriate X—Y address is gated from the system to utilization means.

According to a further feature of the invention, if a plurality of intersection points are found for two particular curves, averaging means are provided for at least approximating the midpoint of the actual intersection of the two curves and said midpoint address is gated out of the system as the intersection point.

A method and means are also provided for determining if two curves have a point of tangency when they exist on two adjacent raster lines but do not actually intersect.

12 Claims, 12 Drawing Figures

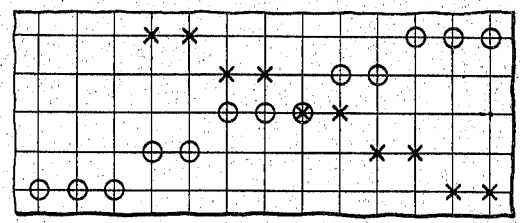
FIG. 2.1
SINGLE POINT OF INTERSECTION
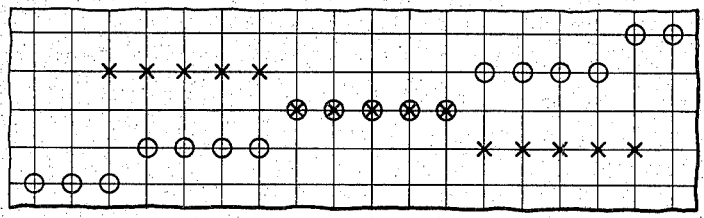
FIG. 2.2
FIVE POINTS OF INTERSECTION
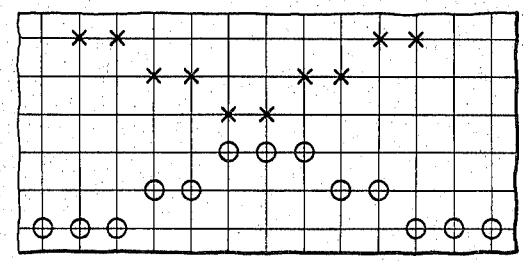
FIG. 2.3
POINT OF TANGENCY, NO INTERSECTION
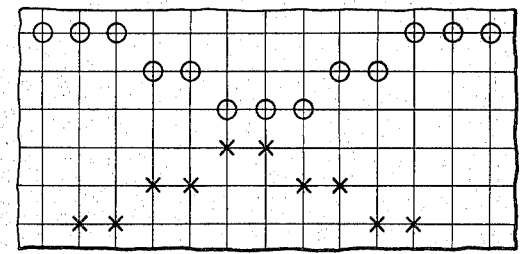
FIG. 2.4
POINT OF TANGENCY, NO INTERSECTION

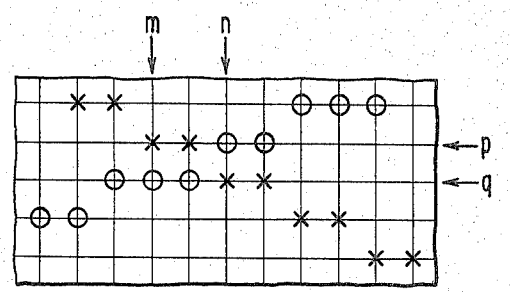
FIG. 2.5
NO POINTS
OF INTERSECTION
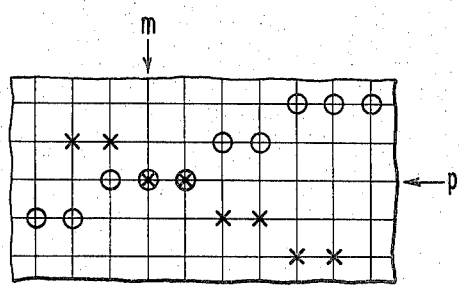
FIG. 2.6
SECOND CURVE UP
ONE RASTER LINE
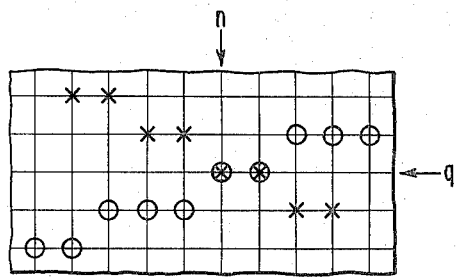
FIG. 2.7
SECOND CURVE DOWN
ONE RASTER LINE

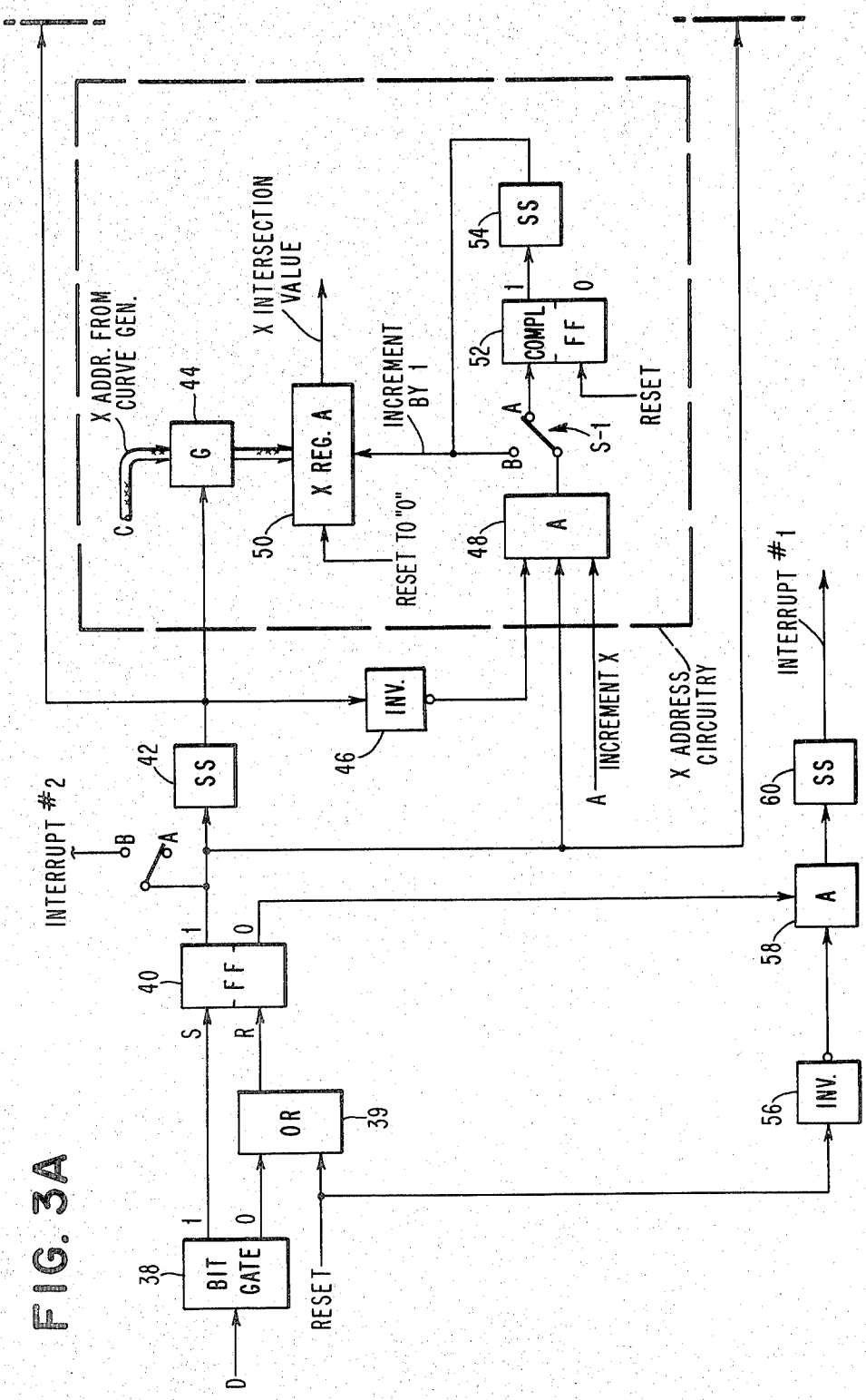

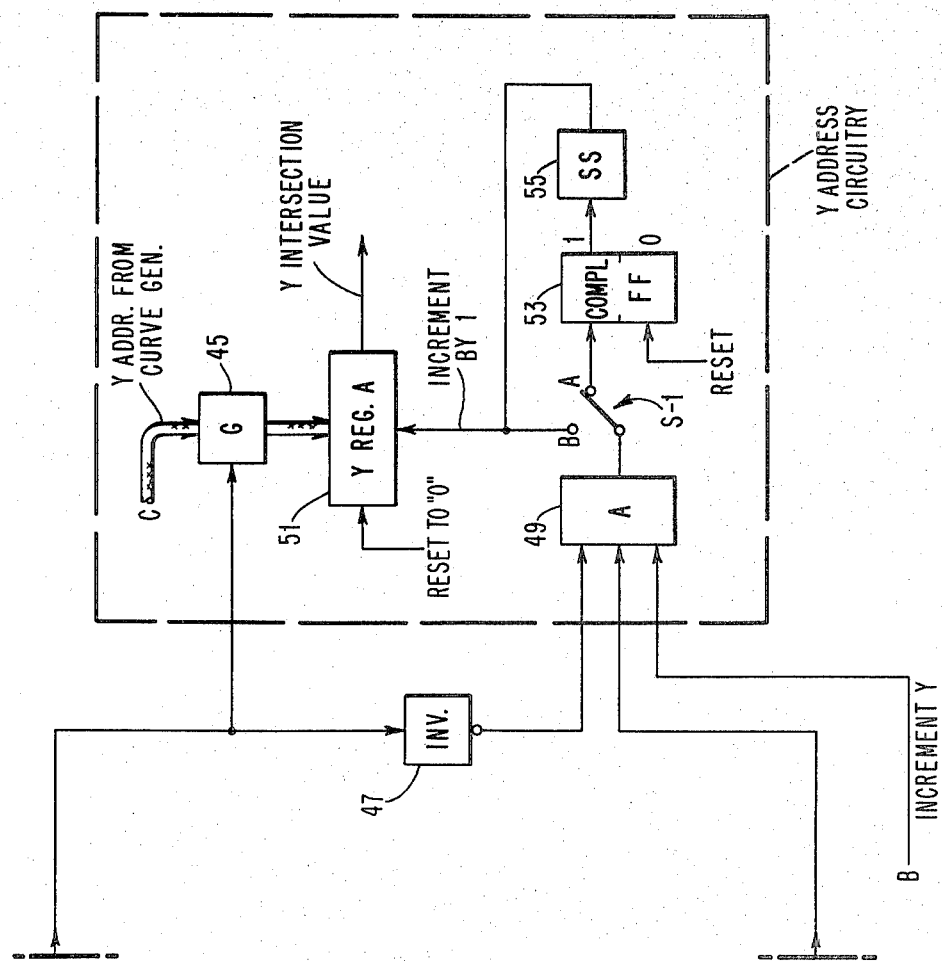

METHOD AND APPARATUS FOR AUTOMATICALLY DETERMINING THE X-Y INTERSECTION OF TWO CURVES IN A RASTER TYPE DISPLAY SYSTEM INCLUDING A BUFFER REFRESH MEMORY

DESCRIPTION

1. Field of the Invention

The present invention relates to digitally refreshed raster type television display systems including a refresh buffer storage and more particularly, to apparatus operational in conjunction therewith to provide a completely digital means for finding the precise intersection coordinates of linear or nonlinear curves which apparatus is a simple addition to the raster display device.

2. Background of the Invention

Cathode ray tube displays have been extensively used in the past as computer output devices to communicate with alpha/numeric or graphical symbols, the results of information processing operations.

Early cathode ray tube displays utilized as output devices for computers were very sophisticated and expensive and, in effect, directly generated the display of a particular alpha/numeric or graphical symbol by sequentially accessing a series of X-Y addresses which defined the particular symbol to be placed on the display screen. An example of a commercial CRT display system of this type is the IBM Model 3250 Graphic Display. However, such displays and their associated electronics have heretofore been extremely expensive. In an effort to reduce the cost of such displays TV type raster displays have been adapted for use as computer output devices as typified by the video display system set forth and described in the article entitled "A Video Display System for Image Processing by Computer" by N. H. Kreitzer and W. J. Fitzgerald in IEEE Transactions On Computers, Volume C-22, No. 2, Feb. 1973, pp. 128–134. With such displays the scan pattern is typically identical to standard commercial TV scan patterns and since the raster is generated in a predetermined synchronized fashion, line by line and frame by frame, the data to be displayed need not be specifically identified with X-Y coordinate (i.e., it need only be properly synchronized with the raster generation). With such TV type displays, it is conventional to have a buffer refresh memory which stores data in digital form i.e., a "1" or a "0." A bit location is specifically provided in this buffer memory for every picture element in the raster display. This raster refresh buffer is completely accessed each time a raster is generated on the screen of the display and any location where a "1" is stored will produce a white spot on the display to thus generate the required alpha/numeric or graphical figures.

Due to the low cost of these displays they are often utilized in conjunction with small computational systems such as the IBM System 7 or Series 1 which have minimal storage capacity and extremely limited computational ability, especially as regards scientific problems of any complexity. It is also common to use such displays in the drafting and graphic arts area with control equipment having virtually no data processing capabilities for such applications as drafting, graphical design, etc.

When using such simple stand-alone systems for constructing geometric figures, engineering drawings, for example, it would often be desirable to be able to find the precise intersection points of lines, circles, elipses, parabolas, and the like. If these exact intersections can be determined, it is possible to obtain exact measurements to be utilized by the operator of the display for such purposes as (1) dimensioning or proportioning an engineering drawing, (2) finding the intersection of two graphs, (3) solving two possibly nonlinear equations simultaneously, by finding the intersections of their curves, (4) finding the intersection point(s) of possibly nonlinear edges in a hidden line removal program, and (5) finding collision points as the points of intersection of two trajectories.

It is accordingly, a primary object of the present invention to provide a method and apparatus for determining the precise X-Y intersections of two curves on a TV raster type display system having a raster refresh buffer memory but having little storage capacity and rudimentary computational or logic capability.

It is yet another object of the invention to provide the powerful function of intersection determination in a very simple straightforward display system without the addition of any significant computational circuitry.

It is a further object of the invention to provide such an intersection determining system utilizing the buffer refresh memory and a simple curve generator in a unique manner combined with a small additional amount of logic circuitry to effect said intersection determination. other objects, features and advantages of the present invention will be apparent from the subsequent description of the herein disclosed embodiment.

DESCRIPTION OF THE PRIOR ART

U.S. Pat. No. 4,020,281 of Davis shows a coordinate approximating system wherein one coordinate is determined by averaging.

U.S. Pat. No. 3,930,237 of Villers discloses a computer assisted drafting system as does U.S. Pat. No. 3,473,157 of C. H. Little et al.

U.S. Pat. Nos. 3,449,721 of Dertouzos et al. and 3,987,284 of Hogan et al. both disclose graphical digital display systems, it being noted that the Hogan et al. patent specifically discloses a television type raster display with a digital raster refresh buffer. These patents are cited to generally illustrate the state of the art in the display area.

U.S. Pat. No. 4,023,025 of Rowe et al., discloses a data processing system wherein a computer operates to select sets of elements approaching a predetermined area around a point of interest.

None of the above patents discloses, or suggests a method and/or apparatus for modifying a digitally refreshed TV type raster display system to digitally determine the intersection point of two curves susceptable of display on the system.

DESCRIPTION OF DRAWINGS

FIGS. 2.1 through 2.7 are display representations of several different intersection conditions which might exist in such a system illustrating the operation of the present invention.

FIG. 3 is an organizational drawing for FIGS. 3A and 3B.

FIGS. 3A and 3B comprise a functional schematic diagram of the Intersection Determining Circuitry block 36 of FIG. 1.

SUMMARY OF THE INVENTION

Figure 1:
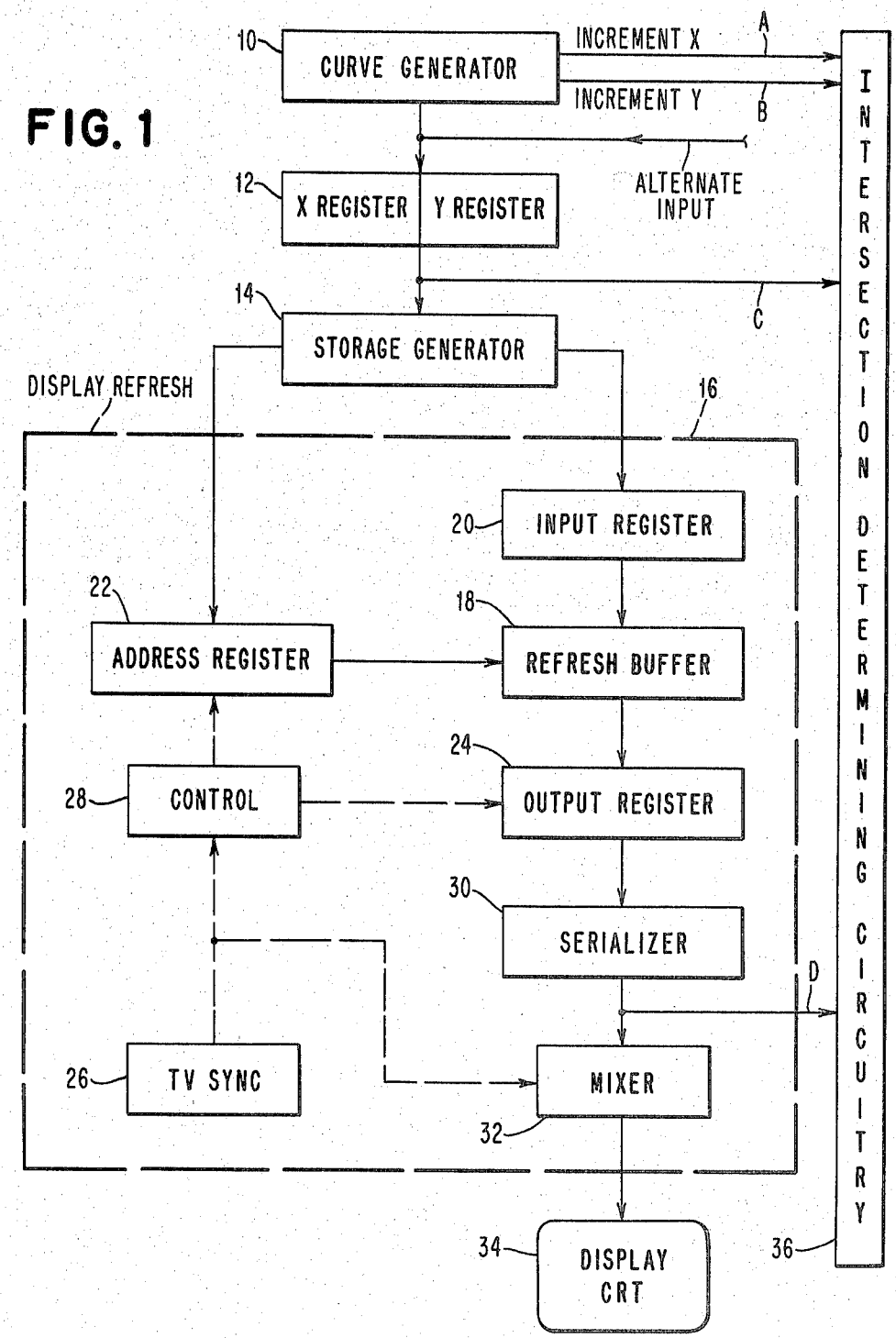
FIG. 1 comprises a functional block diagram of a buffer refreshed raster display system including the intersection determining feature of the present invention.

The objects of the present invention are accomplished in general by providing a small amount of additional hardware and controls for use with an otherwise conventional TV raster type CRT display system equipped with a raster refresh buffer memory for digitally storing the data to be displayed and for periodically refreshing the display. The system is also assumed to be equipped with a conventional programmable curve generator which will produce, when commanded, a series of X-Y coordinates directly relatable to the display, indicating where a particular curve or line segment is to be located on said display. Alternatively, a non-parameterized curve could be generated externally and entered directly into the X-Y register 12 as shown on FIG. 1. The display device is further asssumed to be provided, as would be necessary, with an address generation or translation means for converting the X-Y coordinates produced by the curve generator into appropriate addresses in the buffer refresh memory where the generated curve must be stored in order to be displayed.

The intersection determining mechanism of the present invention utilizes the raster refresh buffer memory together with a small add-on unit utilizing straightforward digital logic to solve geometric construction problems involving the intersection of lines and curves. Stated very broadly, the additional hardware involves two storage registers for storing the X-Y addresses of a particular intersection point and additional logic means for gating addresses into these registers as appropriate, and for subsequently incrementing same in order to find an average midpoint. The logic circuitry in effect serves as a "coincidence" circuit means for detecting the existence of "common" points or pels (picture elements) in the two curves. When such a coincidence occurs, it is known that an actual intersection has been found and the appropriate coordinate data is extracted from the registers utilizing the special purpose hardware provided.

Further, the system is able to detect those conditions of the intersection where two lines do not have common or coincident pels by, in effect, examining adjacent (X and Y) scan lines in the buffer store. Again, substantially the same logic circuitry and control are utilized for this latter operation.

As an additional feature of the invention, controls are provided to determine that the two lines approach each other within a distance of one scan line (i.e., tangent) but do not cross or intersect. This point of approach or tangency is also detectable by the system with very slight modification of the basic intersection determining controls.

The essence of the present system which adds the present computational power in an otherwise straightforward display system resides in the use of the raster refresh buffer inherent in such a display to assist with such geometrical intersection problems. In its simplest form the buffer is laid out to give a one to one relationship between bits in the buffer and spots (pels) on the display. This concept is, of course, well known in the raster display art. Words 1 to N of the buffer contain bits for the top line of the display, words $N+1$ to $2N$ contain the second line of the display, etc., to the bottom of the buffer and display. Any curve to be generated and displayed by the system can be supplied with a series of X-Y coordinates from an appropriate external source or the coordinates may be generated by a curve generator. Each X-Y coordinate is converted into an address and a "1" or "0" stored at the appropriate location in the buffer depending on whether the curve is to be written or erased. When the curve is stored in the buffer it can be displayed by successively accessing the buffer at the beginning thereof, usually a word or a byte at a time, serializing the output from the buffer and presenting it to the display device for generation of the scan pattern. As will be understood, means are provided for automatically synchronizing the accessing of the refresh buffer in synchronism with the raster generation to properly produce this display. The buffer is accessed as often as necessary to produce a flicker-free display.

The philosophy of the present invention is to store the first curve in the buffer refresh memory. The X-Y coordinates for the second curve are then produced and the contents of that location in a buffer memory examined. When a "1" bit is found an intersection has been located. Since a straight line at 45° produces a single pel per raster line, and at smaller angles there are multiple pels per raster line, it is apparent that the intersection may include multiple bits. Accordingly, provision is made to find the mean X-Y, coordinate over the coincident "1's." This essentially involves determining the approximate middle of the coincident bit string. How this is done will be apparent from the subsequent description.

FIGS. 2.1 through 2.7 should be referred to in order to better follow the present discussion. For purposes of the discussion it will be understood that each of the small x's and o's in the figures represent bits making up the first and second curves being analyzed. A cross hatch pattern is used to indicate the X-Y coordinates of these bits or pels. Further, for purpose of the discussion, it will be assumed that the curve represented by the x's is stored in the refresh buffer (first curve) and the curve represented by the o's (second curve) is produced by the curve generator or introduced into the system from an external source.

In FIG. 2.1 it will be noted that each of the curves is composed of two or more pels per raster line but that only one coincident pel represents an actual intersection. In FIG. 2.2 the line widths are shown to be composed of four or five pels and that the intersection occurs over a total of five pels. As will be noted, the middle pel represents the X-Y coordinate of the precise center point of the intersection.

There may also be a situation where there are no bits in common between the two lines, although an intersection exists. This condition is shown in FIG. 2.5. When this condition is found to exist (i.e., no intersection is found) a second pass is made with the generated curve displaced down by one unit in Y. The coordinates of the intervals of contiguous points of intersection are retained. This condition is represented by FIG. 2.7.

Next, a third pass is made with the second curve displaced up by one unit in Y (from the original Y) as shown in FIG. 2.6. The interval of intersection is again determined. An interval of the second pass that is adjacent to an interval of the third pass represents an intersection of the curves. The center of the two intervals provides the precise intersection point.

One further intersection condition which the present system will detect is that illustrated in FIGS. 2.3 and 2.4 where there is a point of tangency but no actual intersection or coincident condition present. The only difference between the two figures is that in FIG. 2.3 the second curve is on the bottom and in FIG. 2.4 the second curve is on the top. In the situation of FIG. 2.4, Pass 1 would reveal nothing, Pass 2 would reveal two points in common and, Pass 3 would reveal nothing. Conversely, with the situation in FIG. 2.3, Pass 1 would reveal nothing, Pass 2 would reveal nothing, and Pass 3 would reveal two coincident points.

The pattern of x's and o's of FIGS. 2.1 through 2.7 assume a curve generation algorithm which permits a change between bits in the X direction, Y direction or both directions. It is possible to design a curve generator that does not permit a change in both directions and this guarantees a common point whenever the curves cross. For this type of curve generator it is not necessary to move the second curve up one unit and down one unit. The remainder of the discussion will consider the more general problem of the curve generator which does permit a change in both directions.

Special logic circuitry disclosed herein loads the X value into an X register (adder) at the beginning of a string of "1's" in the bit buffer and then, in effect, adds half the number of "1's" to this X value (depending on how many coincident bits are present) to get the mean X value. At the end of the string of detected "1's," an interrupt occurs to stop the processor to allow the mean X value to be read out to whatever utilization circuitry is present. As will be well understood, similar circuitry is provided for the Y coordinate as well.

It will thus be seen that essentially all of the data required to determine the precise intersections is actually present in the basic TV raster display system equipped with a buffer refresh memory and that the present system adds logic circuitry to utilize the hardware present in such system in a unique way to provide the required intersection data without the use of complex processing capabilities which is frequently not present in small display systems.

BEST MODE FOR CARRYING OUT INVENTION

The present invention will now be particularly pointed out and described with reference to the herein disclosed embodiment as set forth generally in the functional block diagram of FIG. 1 and in the detailed functional schematic of FIGS. 3A and 3B. As stated previously, the invention is applicable, with normal engineering expertise, to any TV raster type display system having a raster refresh buffer and some means for introducing the X-Y coordinates of one of the curves, whose intersection is to be determined, from either an external source or from a well-known curve generator. Such a generalized display device is shown to the left of FIG. 1, i.e., exclusive of the Intersection Determining Circuitry block 36. A number of such display systems are known in the art, for example, the video display system of Kreitzer and Fitzgerald referenced previously. Reference may also be made to IBM Research Report, No. RC 4080 entitled "Hardware Design of a Digital Raster Display System" by Norman H. Kreitzer, published Oct. 18, 1972 and available from the IBM Research Division in Yorktown Heights, N.Y. 10598. This latter reference describes the working details of such a TV raster type display.

Referring now to FIG. 1, the functional blocks shown by reference numerals 10 through 34 would all be present in a typical TV raster type display system, it being clearly understood that certain controls and data flow paths must, of necessity, be altered to perform in accordance with the present invention as will be described subsequently. The special logic circuitry required by the present invention is shown by the block 36.

The general function of each of the blocks of the basic display system is as follows. Curve generator 10 is a device well known in the art and when provided with curve parameters such as ends of a line segment, the center point and radius of the circle, or with the parameters of an ellipse, parabola, hyperbola, etc., will produce a series of X-Y coordinate values defining the curve. The output of the curve generator must, of course, be tailored to fit a particular display device so that it, in fact, produces a coordinate address for every point or pel in the display which, when illuminated, produces the desired curve. The X and Y registers 12, as is apparent, function to store the addresses produced by the curve generator while they are processed by the storage generator 14.

The storage generator 14 converts a pair of X-Y values into an address and word containing a plurality of bits (pels) to be stored into that address in the refresh buffer. Thus, as many bits of a particular word will be set to "1's" in response to the output of the curve generator 10, as is required. The storage generator 14, in effect, will translate a plurality of X and Y register output addresses from the curve generator into a single address in the refresh buffer and presents this address to the address register 22. As will be understood, the storage generator properly routes the required data word to the input register 20 from whence it will be stored into the refresh buffer 18.

Block 26, marked TV Sync. provides the basic timing for the image supplied from the refresh buffer 18 to the display 34. Its output is also mixed into the signal carrying the data from the buffer in the mixer 32 in order to properly synchronize the display 34 with the output from the refresh buffer 18.

The block marked control 28 provides the proper addresses to the address register 22 to sequentially read the refresh buffer 18 in synchronism with the raster generation. The output from the refresh buffer 18 passes through the output register 24 where it is gated into the serializer 30 under control of the control 28. Thus, as will be appreciated, the words read out of the refresh buffer, have a plurality of bits or bytes therein which are read out in parallel. However, the raster display is generated sequentially, and accordingly, the parallel output from the buffer must be converted into a serial signal. Thus, as the electric beam scans the various picture elements or picture element areas on the screen the proper signal, i.e., or a "1" or a "0," must be placed on the beam intensity control grid depending on whether a display is to occur or is not to occur at that point. The serializer 30 performs the function of converting the signal and passes same into the mixer 32 where, as stated previously, it is mixed or combined with the TV Sync. controls to properly synchronize the raster generation in block 34. It will, of course, be understood that block 34, the block labeled display CRT contains all of the necessary circuitry and controls for generating the raster, synchronizing same in accordance with the sync. signals received and placing the serial video information on the control grid of the CRT in accordance with the data read from the refresh buffer 18.

The underlying philosophy of the present invention involves storing the first curve, whose potential intersections are to be found in the refresh buffer as described previously. This first curve may either be generated by the curve generator 10 as described previously, or by some external input means wherein essentially the input would be the same as the output from the curve generator and would involve a series of X-Y addresses which would be placed in specified locations in the X-Y register 12. The refresher buffer 18 would then be loaded as described previously.

At this point the system is, in effect, reconfigured and the Intersection Determining Circuitry 36 is connected to the display system via lines A, B, C and D. Lines A, B and D, are essentially single bit lines whereas line C would normally be a multi bit cable for transmitting the X and Y addresses to the respective X-Y registers on FIGS. 3A and 3B as shown.

The curve generator 10 is now commanded to produce a second curve whose intersections, with the first curve, now stored in the refresh buffer, are to be determined. When producing the second curve, the curve generator 10, the X and Y register 12, the storage generator 14, and the address register 22 all operate in the same fashion as described before for generating and storing a curve in the refresh buffer 18. However, at this point, the operation becomes different in that the input line to the input register 20 is not functional and the control 28 and TV Sync. 26 are disconnected as the refresh buffer 18 will be accessed strictly under control of the storage generator 14. As described previously, the addresses representing the second curve generated by the curve generator 10 are used to access the refresh buffer 18 which, as will be remembered, has been loaded with the display information (pels) representing the first curve stored therein. Thus, as the refresh buffer 18 is accessed a series of "1's" or "0's" wll be gated out of the refresh buffer 18 via the output register 24 and the serializer 30, and when operating in the "determine intersection" mode, this bit stream will pass out over line D into block 36 where it will enter the bit gate 38 via the similarly lettered line D.

Before proceeding further with the description of the Intersection Determining Circuitry 36 several generalized comments as to the overall operation of the circuit are in order. This circuitry actually performs the counting of strings of "1's" or active pels stored in the refresh buffer 18 which are coincident with the second curve. Thus, it is a function of this circuitry to provide mean X and Y addresses for a particular set of intersection point(s) which are found. It should be noted in passing that if all of the coincident points lie along a single raster line as in all of the examples, there will be a single Y value whereas the X value will be averaged. Conversely, if all of the intersecting coincident points had been along a vertical or Y line, a single X value would have represented the intersection and an average Y value would have been produced by the circuitry.

Returning once again to FIGS. 3A and 3B, it will be noted that the two circuit sections contained within the dotted boxes on FIGS. 3A and 3B, labeled "X Address Circuitry" and "Y Address Circuitry" respectively function in exactly the same way as is evident from their identical configuration. The two registers 50 and 51 receive the contents of the curve generator X and Y register 12 on FIG. 1 whenever an intersection is encountered.

Subsequently, the logic circuitry provided automatically averages the appropriate X or Y value in accordance with the intersection conditions as will be described. The remainder of the circuitry on FIGS. 3A and 3B, in effect, monitors the series of bits received via line D and whenever a "1" is detected, it in effect, energizes the remainder of the circuitry to appropriately process the intersection information.

At this point it should be noted that when operating in the "determine intersection mode" the refresh buffer circuitry operating under control of the storage generator 14 is to be bit addressable (i.e., the particular bit referenced by the X and Y address stored in the register 12 will be specifically accessed and sent via line D to the intersection determined circuitry). Most digital memories are not bit addressable per se and it is necessary to address the correct word and bit within the word as described in Kreitzer et al. referenced previously. It should also be noted that most commercial TV's are interlaced which complicates the storage and display operations as described in the Kreitzer et al. article. But assuming the circuitry for solving these problems is in place in the host display system, this represents no complication to the present invention. Thus, if five consecutive coincident bits were found to exist along a particular horizontal line, five consecutive "1's" would be received by bit gate 38 synchronized with the increment X pulse. In this case, since flip-flop 40 is already set to a "1," the data pulses have no further effect on the circuitry. However, the "increment X" pulses enter the averaging circuitry via AND 48.

To proceed now with the specific description of the operation of the circuitry of FIGS. 3A and 3B, the first operation is that the system clock must reset flip-flops 40, 52, and 53 and also reset the two registers 50 and 51. In this case, it should be noted that Interrupt #1 is inhibited via the inverter 56. This Interrupt would normally signal the end of an intersection determination. It will now be assumed that the curve generator is running and continuously producing X and Y addresses which are causing the refresh buffer to be accessed and a stream of data ("1's" or "0's") to be produced and passed over line D to the circuitry 36.

When the first "1" is encountered, it is passed via bit gate 38 to set flip-flop 40 to its "1" state which activates single shot 42 to produce a pulse which energizes gate 44 and causes the current X address to be gated into X register 50 from X register 12, FIG. 1. Concurrently, the Y address is gated via gate 45 into register 51 from Y register 12. Inverter 46 connected to the output of single shot 42 causes AND circuit 48 to be inhibited and thus does not pass the next pulse appearing on line A (increment X). After the occurrence of the first pulse on line D, each time an adjacent pulse is received on line D, it has no effect on the circuitry since the flip-flop 40 remains set to "1." However, when an appropriately synchronized "increment X" pulse appears on line A it now passes through AND circuit 48 (inverter 46 has returned to its normal state) into the complementing flip-flop 52 which is set to a "1." Each time flip-flop 52 is set to a "1" it produces a pulse from the single shot 54 which causes X register 50 to be incremented. It should be noted that register 50 is an incrementing or counting register provided with circuitry to increment the value currently stored therein each time a pulse is received on its "incrementing" input. The complementing flip-flop 52 is well known in the art and contains internal circuitry whereby consecutive received pulses cause the flip-flop to be alternately set between "1" and "0." Thus, an incrementing pulse is received by the register 50 every other time a pulse is received on the input of the complementing flip-flop 52. This results in a mean X intersection value being stored in X register 50 since when the first coincident bit is detected the register 50 receives the initial X address, when the second pulse is received the register is incremented by one. However, when a third pulse is received, no change in the value of 50 occurs. The sequence continues until the end of the intersection sequence is detected. The result of this operation is that for an odd number of intersection points the precise means value will be stored in register 50 and for even numbers the means value is rounded up.

Assume now that no further coincident points exist in the buffer register for the series of addresses being produced by the curve generator. This results in the next data bit transmitted via line D to bit gate 38 being a "0." This causes flip-flop 40 to be reset to a "0" via OR gate 39 which energizes AND 58 to produce an output pulse from single shot 60 to signal an Interrupt #1 to the system which indicates to the system that the current values in the registers 50 and 51 represent the coordinates of an intersection. It will also be noted that the resetting of flip-flop 40 causes the AND circuit 48 to be inhibited and, accordingly, the increment X pulse which causes the "0" to be introduced into bit gate 38 does not pass through AND 48 and accordingly has no effect on the averaging circuit.

Figure 4:
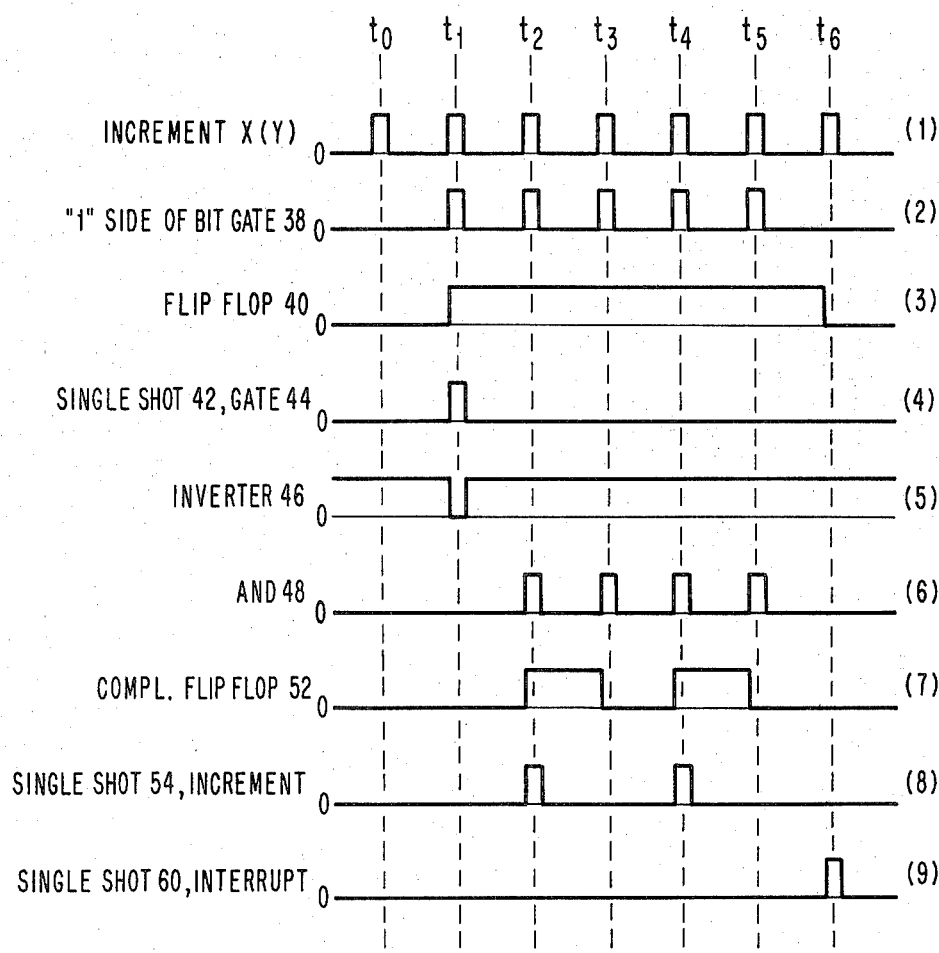
FIG. 4 comprises a sequence of nine wave forms illustrating the signals existing in the circuitry of FIGS. 3A and 3B during a sequence of seven output addresses from the curve generator 10 as shown in FIG. 1.

Reference to FIG. 4 illustrates the respective timing and control conditions which exist at various significant points in the circuit of FIGS. 3A and 3B. The curves of FIG. 4 represent the data condition set forth in FIG. 2.2 where five consecutive concident bits between the two curves are found to exist. Prior to the detection of the intersection condition, all of the circuitry is operating as indicated at time T0, the only data coming into the system that is changing are the consecutive increment X and Y pulses, via lines A and B as shown in curve (1).

When the first coincident bit is detected, a pulse is produced at time T1 as shown in curve (2). This causes the upside of the flip-flop 40 to be energized which condition continues throughout the next five pulse periods as shown in curve (3). Referring to curve (4), single shot 42 causes gate 44 to open which results in the two coordinate addresses being gated into their respective registers, 50 and 51. Inverter 46 whose output is shown in curve (5) prevents the "increment X" pulse from inadvertently incrementing the address in the X register, as it is gated into same during time period T1. During time T2 the averaging circuitry becomes operative as indicated in curve (6) and for the next four received incrementing signals, the indicated four pulses are produced by AND circuit 48. The output of complementing flip-flop 52 is shown in curve (7) and becomes active only during times T2 and T4 to produce output pulses from single shot 54 as shown in curve (8).

Curve (9) illustrates what happens when the string of "1's" ends and a "0" is received over line D during time T6. This time flip-flop 40 resets to "0" which causes a pulse to be transmitted through AND circuit 58 to energize single shot 60 and produce the Interrupt #1 pulse as indicated which informs the system that the current intersection has been completely evaluated.

The operation of the Y address circuitry proceeds in exactly the same way as the X address circuitry; the difference being that if the intersection (comprising a plurality of coincident pels) is found to exist along the horizontal or X axis no "increment Y" pulses are received on line B. Thus, a mean value would have been received and stored in register 50 (X address) and a single value would have been stored in register 51 (Y address). Conversely, if the intersection (comprising a plurality of pels) is found to exist along the vertical (Y) axis of "increment Y" pulses would be received over line B (increment Y) and a single value would be stored in register 50 and a mean value stored in register 51.

This completes the description of the operation of the basic intersection determining circuitry as set forth in the present invention. A brief description will now follow of the functional operations that would occur in the system if provision were made for determining intersections when there are no actual coincident bits between the two curves, which condition is illustrated in FIG. 2.5.

In this case, it is desired to find the full interval over which the two curves are contiguous although non-intersecting. The circuitry of FIGS. 3A and 3B is reconfigured slightly to supply the coordinates of the first and last points of the interval in both X and Y.

In this mode of operation, the output of single shot 40 becomes Interrupt #2, and is sent to the controls to indicate that the address of the first contiguous point, in the interval, has been found. The complementing flip-flop(s) 52 (and 53) is circumvented by changing switch S-1 to its B contact so that every pulse passed by AND circuit 48 increments the X register 50.

To effect this mode of operation the circuitry is reset as before and the second curve is generated as before except up one unit, from its initial position, as shown in FIG. 2.6. When the first "1" bit is detected the contents of the X register 12 are gated into the X register 50 as before, and Interrupt #2 is sent to the control unit as described above to indicate the condition of contiguous points in the lines being detected. This address would correspond to the X address of the vertical line m shown in FIG. 2.6. The system then runs until a "0" is detected on bit line D when Interrupt #1 indicates the end of the interval. At this time m+1 is read from the X register. At this point the system causes the second curve to be, in effect, shifted down one raster line as shown in FIG. 2.7. Again, the system operates as before and this time the addresses of the lines n and n+1, shown in FIG. 2.7 are gated to the system controls. By obvious logical tests, the system is able to determine that the intervals are adjacent and an intersection with no common points has been found. A simple test may be made between the address of m+1 and n, and whichever is largest will be the address (rounded up) in the X direction of the intersection. Similarly, the larger of the two Y addresses P and Q would be the Y coordinate (rounded up) of the intersection.

For the tangent condition an interval of coincidence will be found to exist for the second curve when it is shifted in a first direction, but will not exist when the curve is shifted in the other. For this condition, the count which was saved over the interval may be utilized by the system to determine the midpoint of the tangency. For the just described operation, the controls and logic circuitry for performing the normal determination of coincident points for an intersection as shown in FIGS. 3A and 3B and used in conjunction with FIG.

1 are relatively straightforward and need little extra control. The operations required of the "no points of intersection" condition of FIG. 2.5 in the tangency condition of FIGS. 2.3 and 2.4 would obviously require some extra control and timing both within the circuitry of FIGS. 3A and 3B and within the primary display system of FIG. 1.

The shifting of the second curve along the Y coordinate may obviously be accomplished by merely adding a "1" to every Y address to shift the second curve down and to similarly subtract a "1" from every Y address to, in effect, shift the curve up. These operations could be easily performed by switches or buttons operated on the display console or by a small read only control memory and microprocessor located within the display unit, which will be apparent to those skilled in the art.

Conclusions

Having completed the description of the herein disclosed preferred embodiment of the invention, it will be seen that all of the present circuitry operates in the purely digital mode and utilizes data normally available and primary functional units present in a standard buffer refreshed TV raster type display system. The added circuitry is extremely simple, straightforward and requires no computational or arithmetic operations. It thus provides an extremely inexpensive way of obtaining a significant improvement in the functional capability of such display systems.

Industrial Applicability

The present invention has particular utility in the broad area of TV type buffer refreshed raster displays. However, it has primary utility in those areas where such displays are to be utilized for engineering and architectural graphics wherein extremely precise measurements are necessary. Since the additional circuitry required over a standard display system of this type is very simple and straightforward, its cost would be comparatively low. Accordingly, a significant cost performance improvement for a system embodying the features of the present invention is clearly possible.

Having thus described my invention, what I claim as new, and desire to secure by Letters Patent is:

1. In a buffer refreshed raster type display system including an X-Y addressable raster refresh display buffer, a raster type TV display tube, raster generating circuitry, a source of curve coordinate data for providing a sequence of X-Y addresses in the display coordinates defining a desired curve, and a buffer address generator which translates the series of specific X-Y addresses produced by the curve data source into the appropriate buffer address where the curve data is to be stored, and synchronizing circuitry for controlling the raster generating circuitry and the buffer address generation and access, the improvement which comprises means for determining the intersection coordinates of a first curve currently stored in the raster refresh buffer and a second curve provided by said curve data source, said means for determining comprising, means for causing said curve data source to produce said sequential X-Y addresses defining said second curve, means for converting these addresses into raster refresh buffer addresses, means for accessing said buffer at each generated address, means for determining if there is data stored in said buffer indicative of the existence of the first curve, means for accessing the X-Y addresses when a successful determination is made which addresses comprise the intersection coordinates of the two curves.

2. An intersection determining system as set forth in claim 1 further including means for averaging the addresses of the display locations where an intersection extends over a plurality of such locations to produce a single X-Y address closely approximating the exact center point of the intersection.

3. A display system as set forth in claim 2, wherein said averaging means includes means for storing the X-Y coordinates from the source of coordinate data when a first intersection point is located and means for alternatively incrementing the addresses of one coordinate as successive points along that coordinate are detected.

4. A display system as set forth in claim 3 wherein said means for averaging further includes a complementing flip-flop as its input a series of address incrementing pulses representing coincident curve points, and producing one pulse at its output for every two received at its input.

5. An intersection determining system as set forth in claim 1 including means for determining an intersection point on the display where the two curves do not actually have any common raster display points, and further including means to sequentially shift the position of one curve relative to the other a predetermined distance first in one direction and then in the other and again comparing the data produced for one or more points of intersection.

6. An intersection determining system as set forth in claim 5 wherein said means for determining an intersection point further includes means for determining a point of tangency between two non-intersecting curves and means for detecting that an "intersection" is found to exist when the curves are shifted in one direction but not the curves are shifted in the other.

7. In a buffer refreshed raster type display system including an X-Y addressable raster refresh buffer, a raster type TV display and associated raster generating circuitry, a source of curve coordinate data for providing a sequence of X-Y addresses in the display coordinates defining a desired curve, and a buffer address generator which translates a series of specific X-Y addresses produced by the curve data source into appropriate buffer addresses where the generated curve is to be stored and synchronizing circuitry for controlling the raster generating circuitry, the buffer address generation, and buffer access, the improvement which comprises means for determining the intersection coordinates of two curves displayable by the system, said means including, means for storing the first curve in the raster refresh buffer and for causing the curve data source to produce a series of successive X-Y address defining said second curve, means for accessing said raster refresh buffer at each successive X-Y address produced by said curve data source, means operative on the detection of a first "1" stored in the raster refresh buffer at a specified X-Y address to access the particular X-Y addresses associated with said bit and store same in X-Y storage registers, means for continuing the access of said raster refresh buffer under control of the addresses specified by said curve data source and for incrementing the appropriate address register as successive "1's" are detected along the related display axis, and means operative upon the detection of the first "0" in said sequence of access locations in said raster refresh buffer to indicate that a particular intersection has been completely evaluated and its coordinates ready for readout.

8. An intersection determining system as set forth in claim 7 wherein said means for incrementing the address as subsequent consecutive "1's" are detected in the raster refresh buffer comprises:

means for incrementing the address of the associated X-Y address storage register by "1" on the detection of alternate bits in said buffer subsequent to the detection of the first bit of an intersection which caused the initial loading of the storage registers with the associated X-Y addresses from the curve data source.

9. An intersection determining system as set forth in claim 8 wherein said means for alternately incrementing the addresses includes a complementing flip-flop, and means for supplying address incrementing pulses to the input thereof from the source of coordinate data curve.

10. An intersection determining system as set forth in claim 7 wherein the curve data source comprises a curve generator.

11. An intersection determining system as set forth in claim 7 including means for determining the intersection coordinates of two curves which do not include one or more coincident points on the display comprising:

means for first displacing the second curve a predetermined distance first in one direction and then in the other and testing for intersection intervals after each displacement, means for finding adjacent intersection intervals if found and for selecting the larger of the two adjacent points as the approximate coordinate of the point of intersection.

12. An intersection determining system as set forth in claim 11 including means responsive to the non-detection of an intersection when the two curves are shifted relative to each other along the first axis, for subsequently shifting the second curve relative to the first in two directions along the other axis and for detecting the existence of an intersection along said second axis and for determining the proper intersection coordinate.

* * * * *